United States Patent [19]
Mabuchi

[11] Patent Number: 5,887,023
[45] Date of Patent: Mar. 23, 1999

[54] METHOD AND APPARATUS FOR A FREQUENCY HOPPING-SPREAD SPECTRUM COMMUNICATION SYSTEM

[75] Inventor: Tetsuo Mabuchi, Tokyo, Japan

[73] Assignee: NEC Corporation, Tokyo, Japan

[21] Appl. No.: 759,084

[22] Filed: Nov. 29, 1996

[30] Foreign Application Priority Data

Nov. 29, 1995 [JP] Japan ..................................... 7-311313

[51] Int. Cl.[6] .................................................. H04B 15/00
[52] U.S. Cl. .......................... 375/202; 370/204; 370/481
[58] Field of Search ................................... 375/200, 202; 370/341, 342, 335, 441; 371/32, 35; 455/1, 4.2, 77, 463, 464, 515

[56] References Cited

U.S. PATENT DOCUMENTS

| 5,506,863 | 4/1996 | Meidan et al. | 375/202 |
| 5,537,416 | 7/1996 | MacDonald et al. | 371/32 |
| 5,640,415 | 6/1997 | Pandula | 375/202 |
| 5,657,343 | 8/1997 | Schilling | 375/202 |

FOREIGN PATENT DOCUMENTS

| 6-104865 | 4/1994 | Japan . |
| 8-181680 | 7/1996 | Japan . |

OTHER PUBLICATIONS

Wang, J. and Moeneclaey, M.:'Multiple hops/symbol FH–SSMA with coding for indoor radio',IEE Proceedings–1, vol. 139, No. 1 pp. 95, and 101, Feb. 1992.

*Primary Examiner*—Stephen Chin
*Assistant Examiner*—Joseph Roundtree
*Attorney, Agent, or Firm*—Sughrue, Mion, Zinn, Macpeak & Seas, PLLC

[57] ABSTRACT

The spread spectrum communication system of the present invention is intended to equalize link capacity by taking deterioration of link quality so as to enable reliable communication which enhances the frequency diversity effect even if it is affected by the frequency selective fading or the like. Then, between a base station and a mobile station in a code division multiple access communication system which multiplexes the hopping frequencies by varying them with hopping series different for each channel, a same frequency band is used for a forward-link and a reverse-link, and the number of hopping frequencies and/or the number of hops per one data symbol being assigned is varied according to line quality. There is provided means for performing communication by multiplexing the forward- and reverse-links using the different hopping frequencies for transmission and receiving, so that the link capacity is equalized for the forward- and reverse-links.

12 Claims, 5 Drawing Sheets

METHOD AND APPARATUS FOR A FREQUENCY HOPPING-SPREAD SPECTRUM COMMUNICATION SYSTEM

BACKGROUND OF THE INVENTION

The present invention relates to a method and apparatus for a frequency hopping-spread spectrum wireless communication system, and, more particularly, to a method and apparatus for a frequency hopping-spread spectrum communication system suitably applied to CDMA (Code Division Multiple Access) communication between communication stations having forward-links and reverse-links with different wireless link qualities each other.

Spread modulation systems in a spread spectrum communication system include a direct sequence (DS) system which spreads the spectrum over a wide band by directly multiplying pseudo-random noise (PN) series on information modulated signals, and a frequency hopping (FH) system which uniformly spreads the spectrum by driving a frequency synthesizer in correspondence to hopping series to change (hop) the transmit frequencies of information modulated signals. The FH method in particular has an advantage that transmit power is not required to be controlled because there is no near-far problem, and that it is insusceptible to the frequency selective fading because there is a frequency diversity effect.

In addition, in a mobile communication, communication is performed between a base station and a mobile station by using a forward-link and a reverse-link for transmission and receiving. For its multiplexing, the spectrum spread communication system with the FH system is generally employed to particularly separate and multiplex frequency bands on the forward-link and the reverse-link.

For example, as shown in the time-frequency matrix of FIG. 1, eight hopping frequencies in total ($f_0$, $f_1$, $f_2$, $f_3$, $f_4$, $f_5$, $f_6$, $f_7$) are assigned to the forward- and reverse-links. In this case, the frequency bands on the forward- and reverse-links are separated into a high frequency band and a low frequency band, and multiplexed by using four hopping frequencies ($f_4$, $f_5$, $f_6$, $f_7$) for the reverse-link and four hopping frequencies ($f_0$, $f_1$, $f_2$, $f_3$) for the forward-link. Particularly, in FIG. 1, the hopping frequencies are used between the base station and one mobile station in temporal sequence of ($f_3$, $f_1$, $f_2$, $f_0$, $f_3$) for the forward-link and ($f_5$, $f_6$, $f_4$, $f_7$, $f_5$) for the reverse-link.

Moreover, various other systems are proposed for setting frequency bands for the forward- and reverse-links. For example, a system described in Japanese Patent Application Laid-Open No. 8-181680 is shown in FIG. 2. This system performs transmission and receiving by using a same frequency band of ($f_0$, $f_1$, $f_2$, $f_3$, $f_4$, $f_5$, $f_6$, $f_7$) for the forward- and reverse-links, and by multiplexing using different hopping frequencies such as a frequency band of ($f_1$, $f_3$, $f_5$, $f_7$) for the forward-link and a frequency band of ($f_0$, $f_2$, $f_4$, $f_6$) for the reverse-link. Particularly, in FIG. 2, the hopping frequencies are used in a temporal sequence of ($f_7$, $f_3$, $f_5$, $f_1$, $f_7$) for the forward-link and ($f_2$, $f_4$, $f_0$, $f_6$, $f_2$). With such method, since the hopping frequencies for the forward- and reverse-links are mixed, the frequency diversity effect can be expected even if a frequency band over a wide band is affected by frequency selective fading or the like.

In addition, Japanese Patent Application Laid-Open No. 6-104865 describes a CDMA system in which transmission power control with high accuracy even against fading is attained by using same carrier wave frequencies for the forward- and reverse-links, and performing communication with time division multiplexing. A technique is also disclosed, when link capacity is different for the forward-link and the reverse-link, to accommodate such difference by changing the transmission time of the same carrier wave frequencies.

The conventional frequency hopping-spread spectrum communication system has advantages that the transmission power control imposes less restriction, and there is the frequency diversity effect. However, there is a possibility that there arises difference in link quality for the forward- and reverse links by, for example, difference in the size of antennae between the base station and the mobile station. That is, while the base station uses a large antenna providing sufficient gain, the mobile station is forced to use a small antenna because of necessity for smaller device size. Thus, the reverse-link from the base station to the mobile station is susceptible to radio propagation, so that the bit error rate (BER) of the receive signal tends to be deteriorated. On the other hand, BER is less deteriorated from the mobile station to the base station. The bit error rate (BER) is differently deteriorated by the frequency selective fading or the like due to difference of the frequency band used by the forward-link and the reverse-link.

The conventional system has a disadvantage that it cannot sufficiently accommodate such difference of line quality on the forward- and reverse-links. Particularly, when it is intended to attain the CDMA communication system in the mobile communication or the like, the frequency selective fading causes a considerable problem. The frequency hopping system is said to be inherently insusceptible to the frequency selective fading because it provides the frequency diversity effect. However, in the above-mentioned system to separate and multiplex the frequency bands for the forward- and reverse links, there is such a problem that, if either one of the frequency bands is affected by the frequency selective fading or the like, reliability of the affected link is lowered.

When the code division multiple access is applied to a cellular system, inter-cell interference on the forward-link is an average of interference from the mobile stations uniformly distributed in adjacent cells. However, the inter-cell interference on the reverse-link is required to be evaluated for a case where the mobile station subject to interference is at the worst location such as one end of a cell. Thus, the number of channels available for communication on the reverse-link is less than those on the up-link. Since the number of channels should be generally equal to the forward- and reverse-links, the upper limit of the number of channels is restricted by the number of channels for the reverse-link.

Furthermore, the technique disclosed in Japanese Patent Application Laid-Open No. 6-104865 is intended to attain transmission power control with high accuracy, so that the device becomes complicated because it performs time division multiplexing (TDM) in addition to the code division multiplexing.

The present invention is invented in view of the above problems, and intended to provide a method and apparatus for a frequency hopping-spread spectrum communication system which enables it to improves a link with poor link quality, and to equalize link quality by adequately distributing the number of hopping frequencies and the number of hops per data symbol in a transmission system with different link quality for a forward-link and a reverse-link.

In addition, the present invention is also intended to provide a method and apparatus for a frequency hopping-spread spectrum communication system which, in a transmission system with different link quality for an forward-link and a reverse-link, enables it to perform reliable communication with high frequency diversity effect even if it is affected by frequency selective fading by making the number of hopping frequencies being assigned different from the number of hops, and to equalize link capacity by taking deterioration of wireless link into account.

SUMMARY OF THE INVENTION

To attain these objects, a method for a spread spectrum communication system according to the present invention is a method for a frequency hopping-spread spectrum communication system wherein either one with worse link quality of a forward-link or a reverse link between communication stations is assigned with at least one of the number of hopping frequencies or the number of hops per one data symbol in a number higher than that for the link with better link quality. Preferably, the hopping frequencies for the forward- and reverse-links are in the same frequency band, and mixed each other.

The method for a spread spectrum communication system is suitable for performing code division multiple access between communication stations consisting of one base station and a plurality of mobile stations using the number of hopping frequencies and the number of hops per one data symbol as codes.

Furthermore, the method for a spread spectrum communication system according to the present invention is a method for a frequency hopping-spread spectrum communication system for performing code division multiple access communication between communication stations consisting of one base station and a plurality of mobile stations, wherein at least one of the number of hopping frequencies or the number of hops per one data symbol is increased for the link from the base station to the mobile station, and decreased for the link from the mobile station to the base station.

Specifically, for example, in a code division multiple access communication system between a base station and a mobile station using a frequency hopping system applicable to a cellular system, a same frequency band is used for the forward- and reverse links, at least one of the number of hopping frequencies being assigned or the number of hops per one data symbol being varied for the forward-link and the reverse-link depending on the link quality, the forward- and reverse-links being multiplexed by using different hopping frequencies for transmission and receiving.

BRIEF DESCRIPTION OF THE DRAWINGS

This above-mentioned and other objects, features and advantages of this invention will become more apparent by reference to the following detailed description of the invention taken in conjunction with the accompanying drawings, wherein.

DETAILED DESCRIPTION OF THE PREFERRED EMBODIMENTS

Now, a method for a frequency hopping-spread spectrum communication system of the present invention is described for an embodiment which is applied for a method and apparatus of code division multiple access communication with reference to the drawings.

Figure 1:
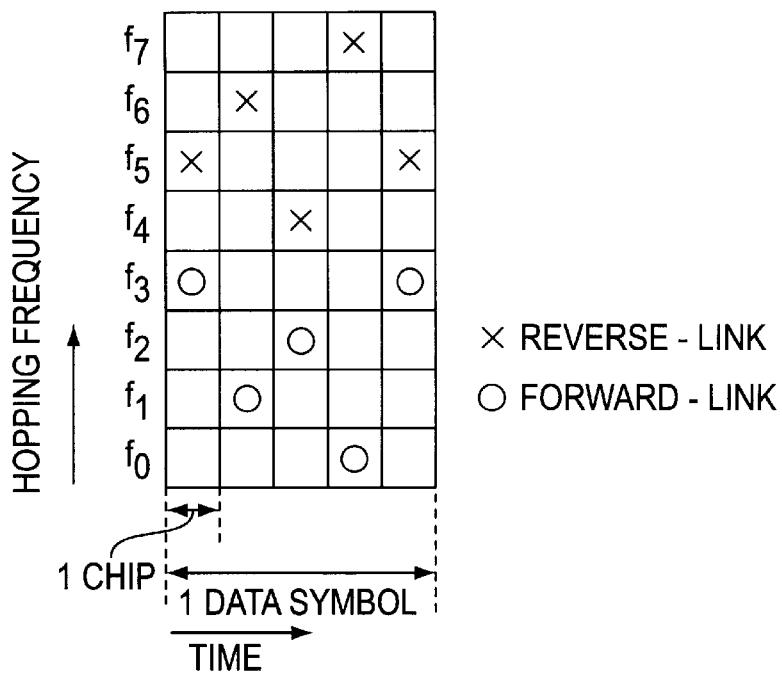
FIG. 1 shows a method for setting hopping frequencies in a conventional spread spectrum communication system, in which they are separated for a forward-link and a reverse-link.
Figure 2:
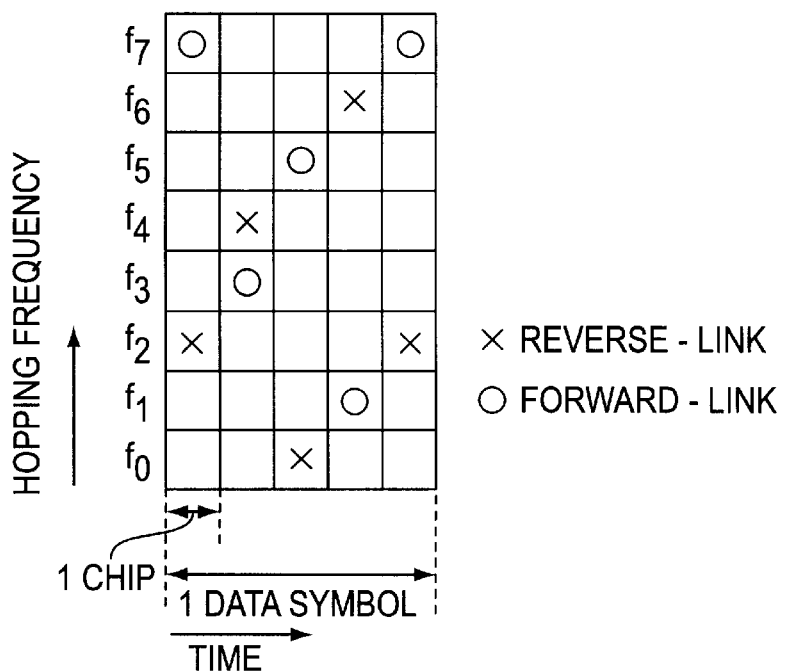
FIG. 2 shows another method for setting hopping frequencies in a conventional spread spectrum communication system, in which they are alternately set.
Figure 3:
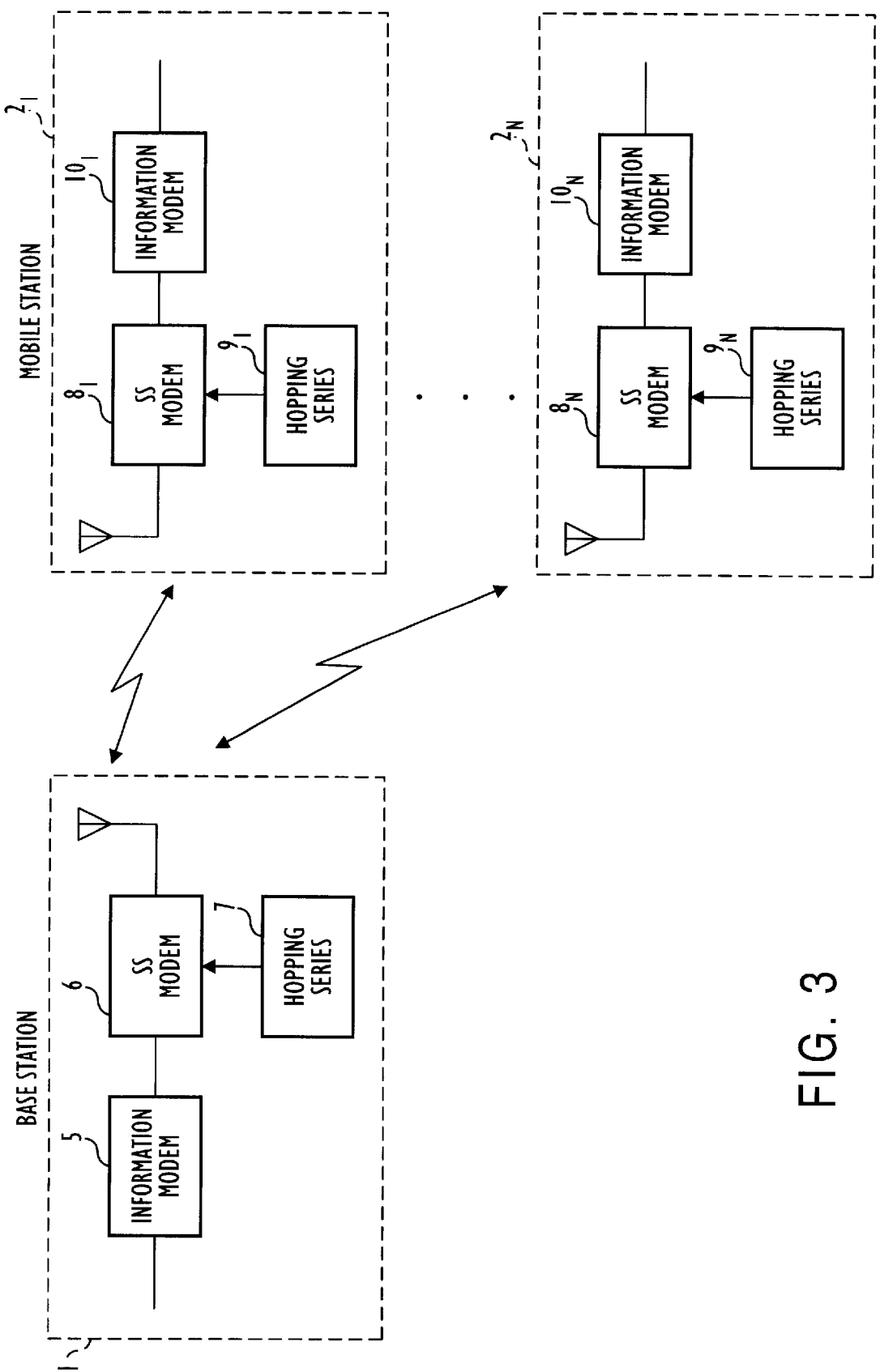
FIG. 3 shows a system block diagram in a first embodiment of the present invention.

FIG. 3 is a system block diagram showing an arrangement of bidirectional radio connection between a base station and a mobile station according to a first embodiment of the present invention. Used for the radio connection of the figure is the code division multiple access communication (CDMA) system using a frequency hopping system which uses a same frequency band is used for the forward- and reverse links, and multiplexing is performed by using different hopping frequencies. Here, 1 denotes a base station, while $2_1$–$2_N$ (N being a natural number) denote mobile stations. In FIG. 3, N mobile stations $2_1$–$2_N$ are assigned with different hopping series, and perform transmission and receiving to and from the base station 1 by using different hopping frequencies which are mixed for the forward- and reverse-links in the same frequency bands, respectively. On the reverse-link, signals information modulated by an information modem section 5 of the base station 1 are spread modulated in a spread modem section 6 by varying the hopping frequencies depending on hopping series 7, and sent to the mobile stations. At the mobile station $2_1$, the received signals are spread demodulated in a spread modem section $8_1$ by using hopping series $9_1$, and information demodulated in an information modem section $10_1$. On the forward-link, transmission is similarly performed from the mobile station $2_1$ to the base station 1. Same arrangement is used for the mobile station $2_N$.

Figure 4:
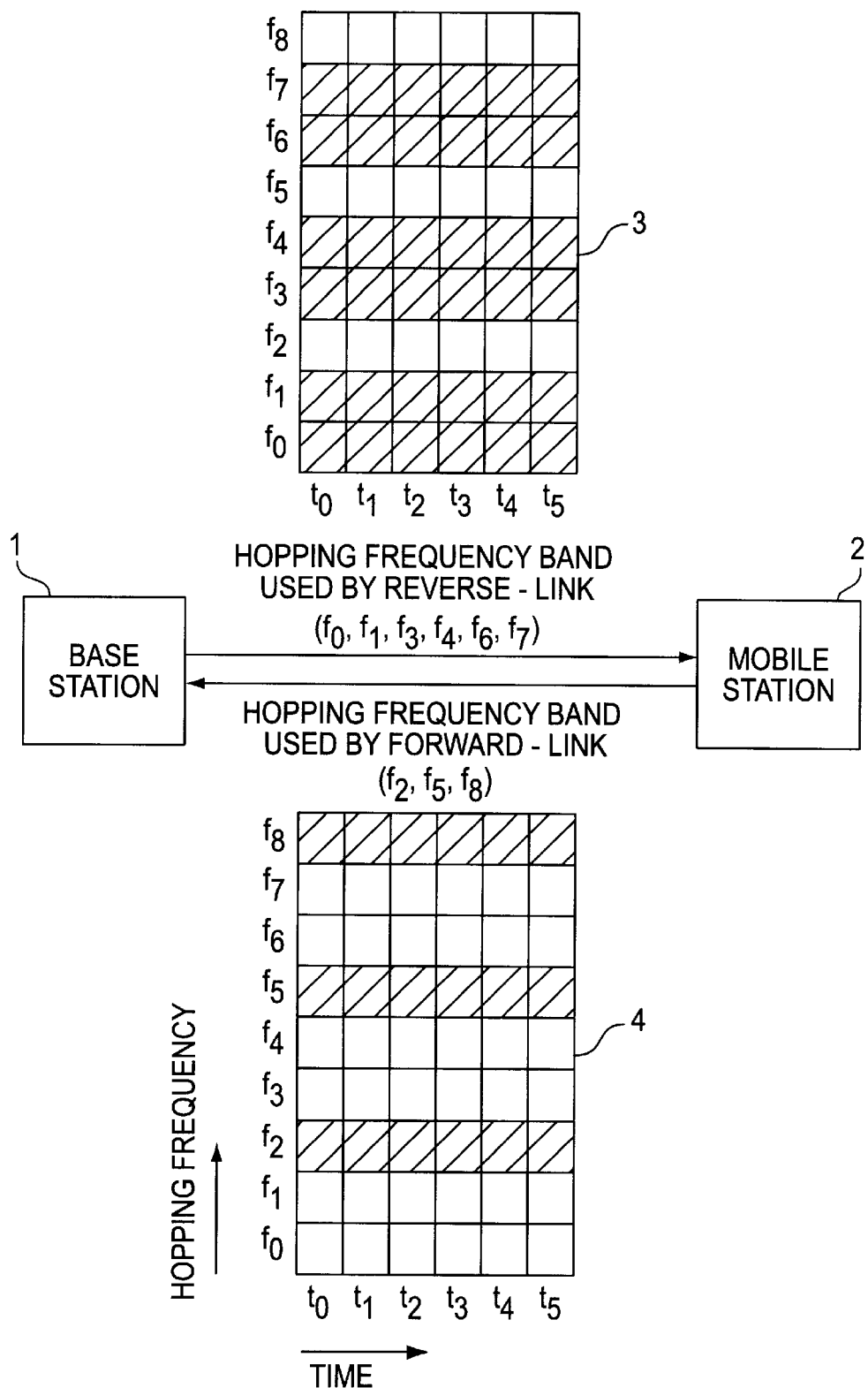
FIG. 4 shows a method for separately assigning the different number of hopping frequencies for a forward-link and a reverse-link in the arrangement of FIG. 3.

According to the present invention, as its basic arrangement is shown in FIG. 4, in the code division multiple access communication system between the basic station 1 and the mobile station 2 using the frequency hopping system, a same frequency band consisting of, for example, nine hopping frequencies ($f_0$, $f_1$, $f_2$, $f_3$, $f_4$, $f_5$, $f_6$, $f_7$, $f_8$) is used for the forward- and reverse-links. Then, transmission and receiving are performed by varying the number of hopping frequencies being assigned in such a manner that three hopping frequency bands ($f_2$, $f_5$, $f_8$) are assigned to the forward-link, six hopping frequency bands ($f_0$, $f_1$, $f_3$, $f_4$, $f_5$, $f_6$, $f_7$) to the reverse-link., and by using different hopping frequencies for multiplexing.

Figure 5:
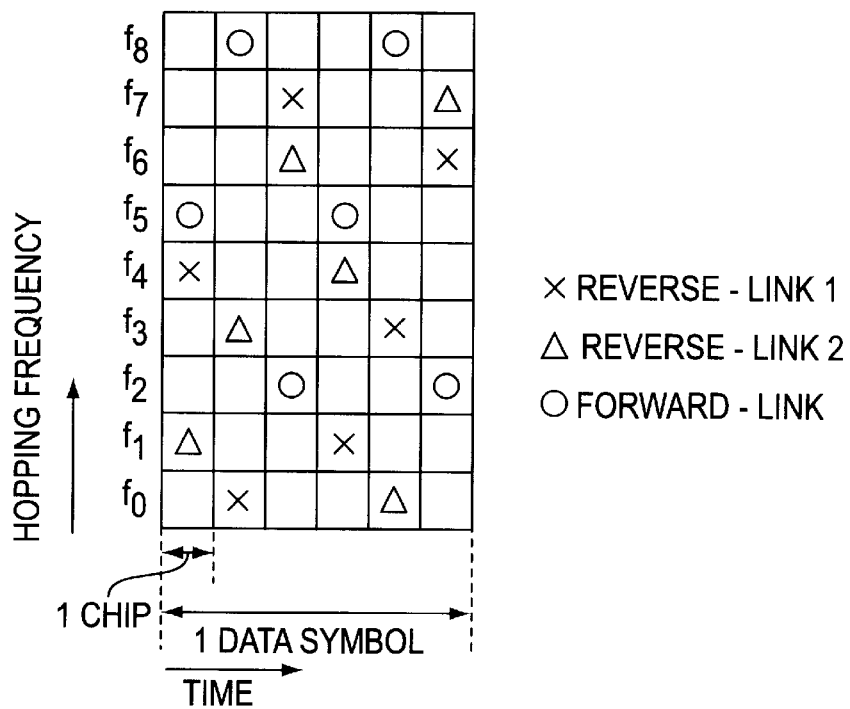
FIG. 5 shows a method for setting the number of hopping frequencies per one data symbol for a forward-link and reverse-links 1, 2 in the arrangement of FIG. 3.

FIG. 5 is a diagram showing an embodiment of relationship between time and hopping frequencies for the forward- and reverse-links between the base station and one mobile station, in which the axis of ordinates represents the entire frequency band (nine hopping frequencies) used for the forward- and reverse-links, and six chips on the axis of abscissas represent one data symbol time. For one data symbol, the forward-link uses the hopping frequencies in a temporal sequence of ($f_5$, $f_8$, $f_2$, $f_5$, $f_8$, $f_2$), the reverse-link 1 in ($f_4$, $f_0$, $f_7$, $f_1$, $f_3$, $f_6$), the reverse-link 2 in ($f_1$, $f_3$, $f_6$, $f_4$, $f_0$, $f_7$).

As described above, according to one embodiment of the present invention, since the number of hopping frequencies for the reverse-link is arranged to be twice that for the forward-link, about twice increase can be expected for the line capacity. Even if the link quality of the reverse-link is worse than the forward-link by about two times, the link quality can be equalized for the forward- and reverse-links, and the link capacity of similar amount can be expected. In addition, even if a wide frequency band is affected by the frequency selective fading or the like, the frequency diversity effect can be expected.

Now, a second embodiment of the present invention is described.

Figure 6:
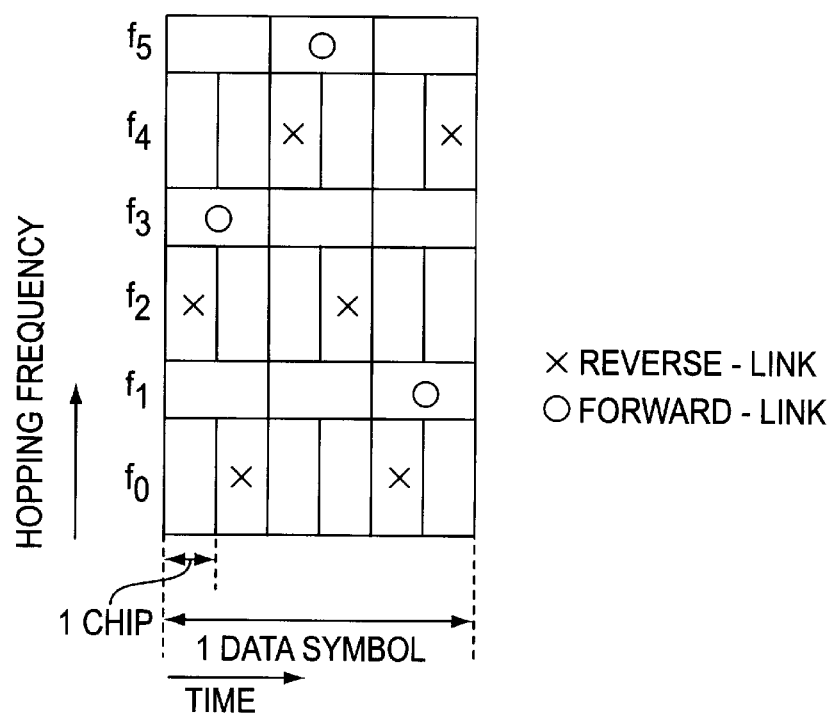
FIG. 6 shows a second embodiment of the present invention, illustrating a method for setting hopping frequencies when the number of hopping frequencies per data symbol is varied.

FIG. 6 is a diagram showing the second embodiment of the present invention for the relationship of time and hopping frequencies for the forward- and reverse-links between the base station and one mobile station. For one data symbol, the forward-link uses the hopping frequencies in a temporal sequence of ($f_3$, $f_5$, $f_1$), the reverse-link in ($f_2$, $f_0$, $f_4$, $f_2$, $f_0$, $f_1$).

As described, according to the second embodiment of the present invention, since the number of hops per one data symbol is larger on the down link than on the forward-link, redundancy per one data symbol can be increased to equalize the link quality for both lines, and to increase the link capacity. Therefore, even if the link quality of the reverse-link is worse than the forward-link, equal link capacity can be expected for both the forward- and reverse-links. In addition, even if a wide frequency band is affected by the frequency selective fading or the like, the frequency diversity effect can be expected.

Now, a third embodiment of the present invention is described.

For the link quality, the bit error rate is previously measured at the demodulated output of the respective information modem 5, $10_1$–$10_N$, and the hopping frequencies are previously assigned in a fixed manner according to the link quality.

In the first and second embodiments described above, the hopping frequencies are previously assigned on the basis of difference of link quality on the forward- and reverse-links.

However, the present invention is not limited to such arrangement, but the link quality on both links may be automatically equalized by automatically varying the number of hopping frequencies or the number of hops per data symbol according to the state of respective bit error rate on the forward- and reverse-links.

An invention for automatically controlling the number of hopping frequencies or the number of hops per data symbol is a third embodiment of the present invention.

Now, the third embodiment of the present invention is specifically described with reference to FIG. 7.

Figure 7:
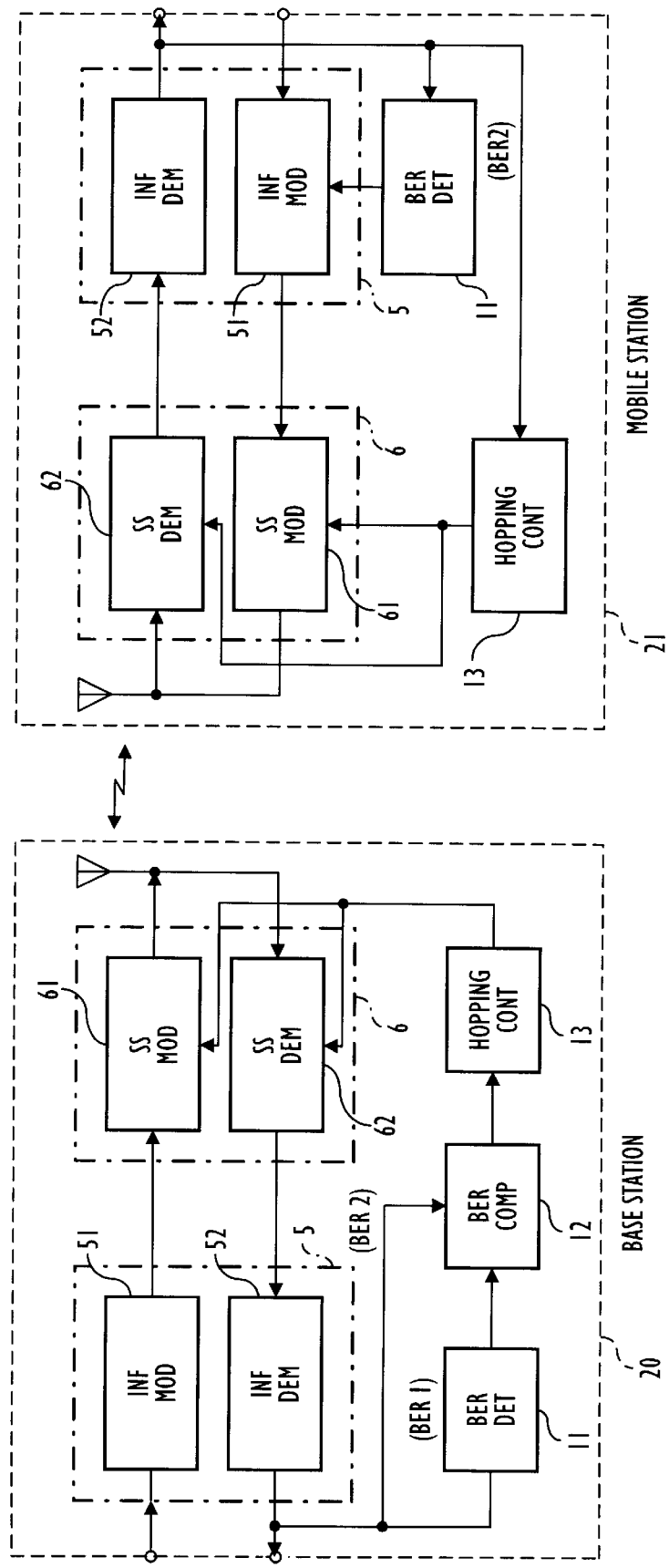
FIG. 7 shows a system block diagram of a third embodiment of the present invention.

FIG. 7 is a block diagram showing an arrangement of bidirectional radio connection between a base station 20 and any one of a plurality of mobile stations $2_1$ according to the third embodiment of the present invention.

In the figure, the transmitter side of the base station 20 modulates data to be transmitted with an information modulator $5_1$ to the mobile stations $2_1$, then spread modulates them with a spectrum spread modulator (SS MOD) 61, and transmits them as radio signals On the other hand, the receiver side inverse spreads signals with a spectrum spread demodulator (SS DEM) 62 then modulates them with an information demodulator 52, and outputs as received data. Here, the hopping frequencies for spectrum spread modulator 61 and the spectrum spread demodulator 62 are controlled a hopping frequency controller (HOPPING CONT) 13.

The hopping frequency controller 13 controls the hopping frequency as follows. That is, the bit error rate BER 1 on the forward-link of output data from the information demodulator 52 is detected by a BER detector 11. Then, the value of this BER (BER 1) is compared with a value of BER (BER 2) detected by a BER detector 11 of the mobile station by a BER comparator 12 to find a difference of both values $\Delta BER=BER\ 1-BER\ 2$. Then, when $\Delta BER$ is larger than a predetermined value $\epsilon$, it is determined that the forward-link is poorer than the reverse-link for the link quality.

Accordingly, in this case, control is performed in such a manner that the number of hopping frequencies assigned to the forward-link is larger than that assigned to the reverse-link.

On the other hand, when $\Delta BER$ is less than the predetermined value $\epsilon$, it is oppositely determined that the forward-link is better than the reverse-link for the link quality. Thus, control is performed in such a manner that the number of hopping frequencies assigned to the forward-link is smaller than that assigned to the reverse-link.

In addition, when the difference between BER 1 and BER 2 is equal to the predetermined value $\epsilon$, it is determined that the link quality is substantially same for the forward- and reverse-links. Then, in this case, the hopping frequencies are not varied. Thus, the number of hopping frequencies for the forward- and reverse-links is automatically controlled depending on the difference of link qualities on these links.

Then, at the mobile station $2_1$, the output data from the information demodulator 52 is input into the BER detector 11 to find the bit error rate (BER 2) on the reverse-link. This value is input into the information modulator $5_1$, and transmitted to the base station 20 as a part of the transmission data from the mobile station $2_1$.

Finally, the number of hopping frequencies for the forward- and reverse-links determined by the hopping frequency controller 13 of the base station 20 as described above is established as follows.

The base station 20 transmits the number of hopping frequencies for the forward- and reverse-links to each mobile station by using a plurality of control data links separate from the spread signals. Then, each mobile station receives the control data link. The base station 20 and each mobile station operate at the same number of hopping frequencies.

Alternatively, the spectrum spread processing is stopped for a part of the spread signals (for example, the top of data) transmitted from the base station 20. Then, after that part is normally received by each mobile station, the base station and the mobile stations operate at the predetermined number of hopping frequencies.

Still alternatively, the number of hopping frequencies to be set next is previously transmitted to each mobile station from the base station when the number of hopping frequencies is varied, so that the base station and the mobile stations operate at the predetermined hopping frequencies.

While the third embodiment is described for a method for automatically varying the number of hopping frequencies for the forward- and reverse-links for the link quality, it may be applied not to a method for changing the number of hopping frequencies, but also, as described for the second embodiment, to a method for changing the number of hops per data symbol.

While the present invention has been described for the code division multiple access communication system as the embodiments, the present invention bases on the frequency hopping-spread spectrum communication system which enables it to equalize the quality of links between communication stations with different link qualities for the forward- and reverse-links, and to assure the link capacity.

In addition, while the embodiments of the code division multiple access communication system have been described for a case where one of the number of hopping frequencies or the number of hops per data symbol for a link with worse link quality is increased over that for a link with better link quality to improve the quality, it may be possible to relatively increase or decrease both the number of hopping frequencies and the number of hops between the links. In such case, combination of them can provide significant improvement in the quality or the like. Moreover, the number of hopping frequencies or the number of hops may be assigned and distributed between the forward-link and the reverse-link so as to equalize the quality each other within a predetermined range of quality, and to equalize and assure maximum line capacity for the forward- and reverse-links.

According to the present invention, in the frequency hopping-spread spectrum communication system between the communication stations, even in a transmission system with different link quality in the direction of link, it is possible to improve the link quality and to equalize the qualities of both links.

In addition, when the forward- and reverse-links with different link quality are multiplexed, since the number of hopping frequencies is made different for the forward- and reverse-links, respectively, mixed in the same frequency band, and hopped over a wide band, it can be attained to equalize the link capacity for the forward- and reverse-links, and to provide the frequency diversity effect against the frequency selective fading which affects a wide frequency band.

Furthermore, since the number of hops per data symbol for the forward- and reverse-links is varied, mixed in the same frequency band, and hopped over a wide band, it can be attained to equalize the link capacity for the forward- and reverse-links, and to provide the frequency diversity effect against the frequency selective fading which affects a wide frequency band.

What is claimed is:

1. A method for a frequency hopping-spread spectrum communication system, said method comprising the steps of:
    detecting a difference of link quality for a forward-link and a reverse-link between opposing communication systems in said frequency hopping-spread spectrum communication system; and
    assigning at least one of a number of hopping frequencies or a number of hops per one data symbol according to said difference of link quality.

2. The method as set forth in claim 1, further comprising the step of:
    mixing the hopping frequencies for said forward-link and said reverse-link in the same frequency band.

3. The method as set forth in claim 1, further comprising the steps of:
    performing code division multiple access communication between communication stations comprising one base station and a plurality of mobile stations by using the number of hopping frequencies and the number of hops per one data symbold as codes.

4. The method as set forth in claim 1, wherein said step of determining said difference of link quality comprises the step of determining a bit error rate in said communication systems.

5. A method for frequency hopping-spread spectrum communication system, said method comprising the steps of:
    detecting a difference of link quality for a forward-link and a reverse-link between opposing communication stations in said frequency hopping-spread spectrum communication system; and
    automatically varying at least one of a number of hopping frequencies or a number of hops per one data symbol according to said difference of link quality.

6. The method as set forth in claim 5, wherein said step of automatically varying comprises the step of measuring a bit error rate of said forward-link and said reverse-link at each of said base station and said mobile stations to find said difference of link quality;
    decreasing the number of hopping frequencies or the number of hops per one data symbol assigned to said forward-link when said difference of link quality is larger than a predetermined value; and
    increasing the number of hopping frequencies or the number of hops per one data symbol assigned to said forward-link when said difference of link quality is less than said predetermined value.

7. An apparatus for performing code division multiple communication between communication stations in a frequency hopping-spread spectrum communication system having one base station and a plurality of stations, said apparatus comprising:
    means for mixing a number of hopping frequencies for a forward-link and a reverse-link between said communication stations in the same frequency band;
    means for determining a difference of link quality for said forward-link and said reverse-link between opposing communication stations; and
    means for assigning at least one of the number of hopping frequencies or a number of hops per one data symbol to be larger for a link with poor link quality than for a link with good quality.

8. An apparatus for performing code division multiple access communication between communication stations for a frequency hopping-spread spectrum communication system having one base station and a plurality of mobile stations, said apparatus comprising:
    means for mixing a number of hopping frequencies for a forward-link and a reverse-link in a same frequency band;
    means for determining a difference of link quality for said forward-link and said reverse-link between opposing communication stations;
    means for setting at least one of the number of hopping frequencies or the number of hops per data symbol according to said difference of link quality; and
    means for multiplexing said forward-link and said reverse-link by using different hopping frequencies for transmission and receiving.

9. The apparatus as set forth in claim 7, wherein the line quality is determined by bit error rate detected at the receiver side of said base station or mobile station.

10. An apparatus for performing code division multiple communication between communication stations in a frequency hopping-spread spectrum communication system having one base station and a plurality of stations, said apparatus comprising:

means for mixing a number of hopping frequencies for a forward-link and a reverse-link between said communication stations in the same frequency band;

means for determining a difference of link quality for said forward-link and said reverse-link between opposing communication stations; and means for automatically varying at least one of the number of hopping frequencies or a number of hops per one data symbol to be larger for a link with poor link quality than for a link with good link quality.

11. The apparatus as set forth in claim 10, wherein said means for automatically varying said at least one of the number of hopping frequencies or the number of hoes per one data symbol is arranged to determine a bit error rate of said forward-link and said reverse-link at each of said base station and said mobile stations to find said difference of link quality, and to decrease the number of hopping frequencies or the number of hops per one data symbol assigned to the forward-link when said difference of link quality is larger than a predetermined value; and increasing the number of hopping frequencies or the number of hops per one data symbol assigned to the forward-link when said difference of link quality is less than said predetermined value.

12. An apparatus for performing code division multiple access communication between communication stations for a frequency hopping-spread spectrum communication system having one base station and a plurality of mobile stations, said apparatus comprising:

means for mixing a number of hopping frequencies for a forward-link and a reverse-link in a same frequency band;

means for determining a difference of link quality for said forward-link and said reverse-link between opposing communication stations;

means for automatically varying at least one of the number of hopping frequencies or the number of hops per data symbol according to said difference of link quality; and means for multiplexing said forward-link and said reverse-link by using different hopping frequencies for transmission and receiving.

* * * * *

UNITED STATES PATENT AND TRADEMARK OFFICE
CERTIFICATE OF CORRECTION

PATENT NO. : 5,887,023
DATED : March 23, 1999
INVENTOR(S) : Tetsuo MABUCHI

It is certified that error appears in the above-indentified patent and that said Letters Patent is hereby corrected as shown below:

In the Abstract, line 13, delete "means".

Column 6, line 12, delete "$\varepsilon$" and insert --$\acute{\varepsilon}$--;

Column 6, line 19, delete "$\varepsilon$" and insert --$\acute{\varepsilon}$--; and Column 6, line 26, delete "$\varepsilon$" and insert --$\acute{\varepsilon}$--.

Column 9, line 15, delete "hoes" and insert --hops--.

Signed and Sealed this

Twenty-sixth Day of October, 1999

Attest:

Q. TODD DICKINSON

*Attesting Officer*   *Acting Commissioner of Patents and Trademarks*